United States Patent
Han

[11] Patent Number: 6,084,204
[45] Date of Patent: *Jul. 4, 2000

[54] LEADFRAME MANUFACTURING APPARATUS USING LASER BEAMS

[75] Inventor: Seong-young Han, Yongin, Rep. of Korea

[73] Assignee: Samsung Aerospace Industries, Ltd., Changwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 09/062,664

[22] Filed: Apr. 20, 1998

[30] Foreign Application Priority Data

Apr. 21, 1997 [KR] Rep. of Korea ...... 97-14777
Mar. 24, 1998 [KR] Rep. of Korea ...... 98-10151

[51] Int. Cl.⁷ .................................. B23K 26/38
[52] U.S. Cl. ................. 219/121.67; 219/121.73
[58] Field of Search ........... 219/121.61, 121.67, 219/121.68, 121.73, 121.75, 121.82

[56] References Cited

U.S. PATENT DOCUMENTS

| | | | |
|---|---|---|---|
| 4,978,830 | 12/1990 | Millerick et al. | 219/121.67 |
| 5,580,466 | 12/1996 | Tada et al. | 29/827 |
| 5,632,083 | 5/1997 | Tada et al. | 219/121.68 X |
| 5,662,822 | 9/1997 | Tada et al. | 219/121.67 |
| 5,767,480 | 6/1998 | Anglin et al. | 219/121.69 |

FOREIGN PATENT DOCUMENTS

| | | | |
|---|---|---|---|
| 244852 | 4/1987 | German Dem. Rep. | 219/121.67 |
| 59-156588 | 9/1984 | Japan . | |
| 59-225895 | 12/1984 | Japan . | |
| 2-84757 | 3/1990 | Japan . | |
| 2-143552 | 6/1990 | Japan . | |
| 4-367388 | 12/1992 | Japan . | |
| 6-320293 | 11/1994 | Japan . | |
| 8-17985 | 1/1996 | Japan . | |
| 8-33992 | 2/1996 | Japan . | |

*Primary Examiner*—Gregory Mills
*Attorney, Agent, or Firm*—Howery Simon Arnold & White, LLP

[57] ABSTRACT

A leadframe manufacturing apparatus includes a laser beam generator, a laser beam path tube through which laser beams travel, a leadframe transferring unit which transfers leadframe material to be irradiated by the laser beams, a controller connected to the laser beam generator and the leadframe transferring unit, which controls the transfer and irradiation of the leadframe material, a laser mask having a predetermined pattern, placed between the laser beam generator and the leadframe transferring unit, and a laser beam absorbing unit for supporting the leadframe transferring unit. A leadframe may also be manufactured by coating a leadframe material with a photoresist film capable of blocking the laser beams, and then patterning the photoresist film.

9 Claims, 5 Drawing Sheets

LEADFRAME MANUFACTURING APPARATUS USING LASER BEAMS

BACKGROUND OF THE INVENTION

1. Field of the Invention

The present invention relates to a leadframe used in a semiconductor assembly process, and more particularly to a leadframe manufacturing apparatus using laser beams and a method for manufacturing a leadframe using the same.

2. Description of the Related Art

In general, a leadframe is a core constituent of a packaged semiconductor integrated circuit, providing an electrical connection between the inside and outside of a semiconductor package and also acting as a mechanical support for the semiconductor chip. A leadframe consists of a chip pad for mounting a chip, an inner lead, and an external lead. Generally, there are two ways of manufacturing a leadframe. A stamping method uses a mold to manufacture a leadframe. A sequential transfer-type press machine transfers and presses the material to manufacture the leadframe in a predetermined shape. Even though the stamping method can achieve mass production, it takes 6 to 10 months to prepare a mold and the initial investment for a mold is very expensive. On the other hand, an etching method puts a photoresist layer on a leadframe material, and processes it through photolithography resulting in a leadframe having a predetermined pattern. The etching method is suitable for forming a fine pattern and the development time is short. However, it is difficult and expensive to achieve mass production.

As semiconductor packages require more closely spaced leads, limitations of the above-described two methods have been revealed. The stamping method has mechanical problems due to the weakness of such parts as a punch and die used in a pressing apparatus. The etching method reveals a limitation in achieving a fine pattern.

SUMMARY OF THE INVENTION

In order to solve the above mentioned problems, the present invention provides a leadframe manufacturing apparatus using laser beams and a method for manufacturing a leadframe using laser beams.

The present invention provides a leadframe manufacturing apparatus with a laser beam generator, a leadframe transferring unit, a controller and a laser beam absorbing unit to support the leadframe transferring unit.

The present invention also provides a leadframe manufacturing method including the steps of transferring a leadframe material; irradiating laser beams; and collecting a portion of the leadframe material.

The present invention further provides a leadframe manufacturing method including the steps of coating a leadframe material with a photoresist film to block the laser beams; patterning the photoresist film; irradiating the laser beams from the laser beam generator onto the leadframe material having the patterned photoresist film to remove a portion of the leadframe material exposed by the photoresist pattern; and collecting the portion of the leadframe material removed by irradiating the laser beams, into the laser beam absorbing unit.

BRIEF DESCRIPTION OF THE DRAWINGS

The above objectives and advantages of the present invention will become more apparent by describing in detail preferred embodiments thereof with reference to the attached drawings in which.

DESCRIPTION OF THE PREFERRED EMBODIMENTS

Referring to FIGS. 1 through 4, a leadframe manufacturing apparatus using laser beams according to an embodiment of the present invention and a leadframe manufacturing method using the apparatus will be described.

Figure 1:
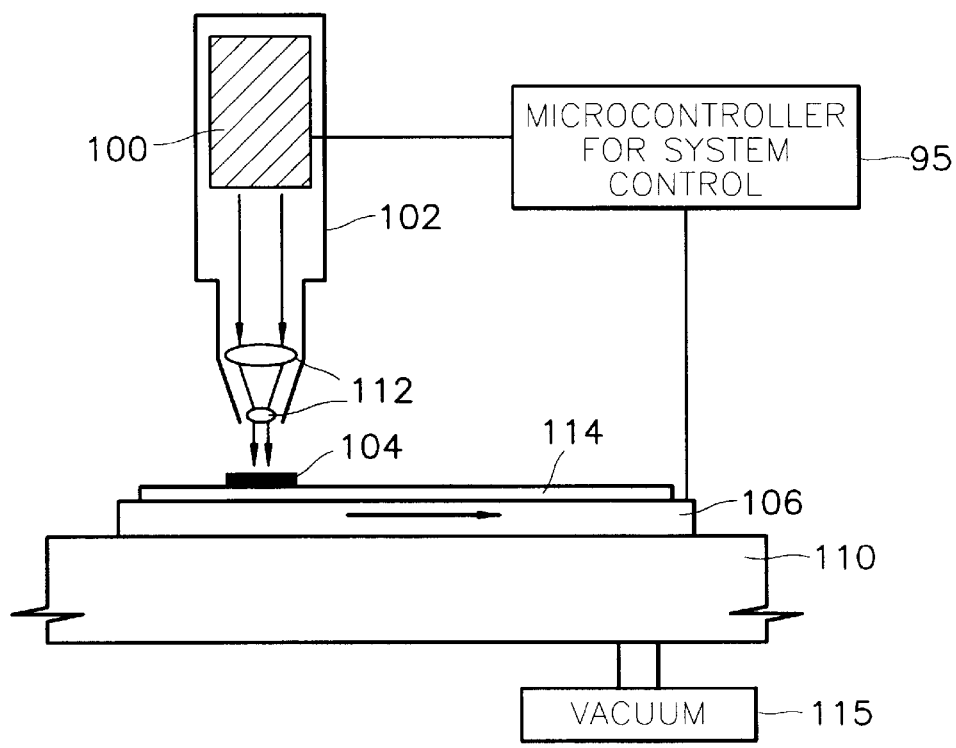
FIG. 1 shows a leadframe manufacturing apparatus using laser beams according to a preferred embodiment of the present invention.

As shown in FIG. 1, in a leadframe manufacturing apparatus using laser beams according to a first embodiment of the present invention, a laser beam generator 100 is placed at the top of the apparatus and a laser beam path tube 102, through which the laser beams generated by the laser beam generator 100 are transferred, is placed below the laser beam generator 100. A laser mask 104 having a leadframe pattern is placed between the laser beam generator 100 and a leadframe transferring unit 106 on which a leadframe material is mounted. A laser beam absorbing unit 110 is placed below the leadframe transferring unit 106, for absorbing the laser beams generated by the laser beam generator 100 while supporting the leadframe transferring unit 106. Here, collimators 112, consisting of a lens set, forces laser beams to irradiate downward uniformly and in parallel within the laser beam path tube 102. The leadframe transferring unit 106 transfers a strip of leadframe material 114 by a distance equal to an interval between leadframe material, to process the leadframe material using the laser beams generated by the laser beam generator 100. Also, the laser mask 104 contains the pattern to be formed on the leadframe material 114, such that the laser beams irradiated via the laser beam path tube 102 are irradiated only on a portion of the leadframe material, exposed by the pattern. The portion of the leadframe material 114 exposed to the laser beams irradiated via the laser mask 104 is removed, and the removed portion of the leadframe material 114 is sucked out below by a vacuum pump 115 installed in the laser beam absorbing unit 110. Here, the irradiation sequence and intensity of the laser beams generated by the laser beam generator 100, and the position of the leadframe material 114 transferred by the leadframe transferring unit 106, are controlled by a controller 95 for the overall control of the leadframe manufacturing apparatus.

Figure 2:
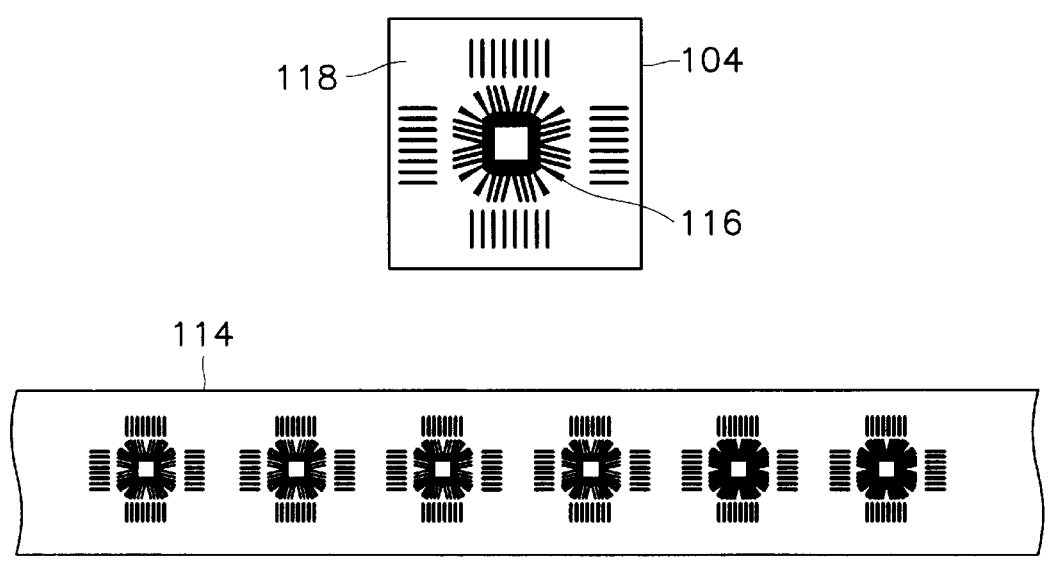
FIG. 2 is an enlargement showing the plans of a laser mask of FIG. 1 and a processed leadframe material.

FIG. 2 is an enlargement of the laser mask 104 shown in FIG. 1 and the leadframe material 114 which was processed in FIG. 1.

In detail, the laser mask 104 has a pattern to be patterned onto the leadframe material. Here, a black portion 116 is a hole through which the laser beams pass. The laser beams passing through the hole 116 cut a portion of the leadframe material in the same shape as the mask. Also, a white portion is a body 118 which is coated with a laser beam absorbent, through which the laser beams cannot pass. The pattern formed in the laser mask 104 may be a part of the leadframe pattern, or the entire leadframe pattern. For example, the pattern of the laser mask 104 may be an inner lead tip 116 which is the most difficult portion of the leadframe to process, or a pattern of the entire leadframe.

Figure 3:
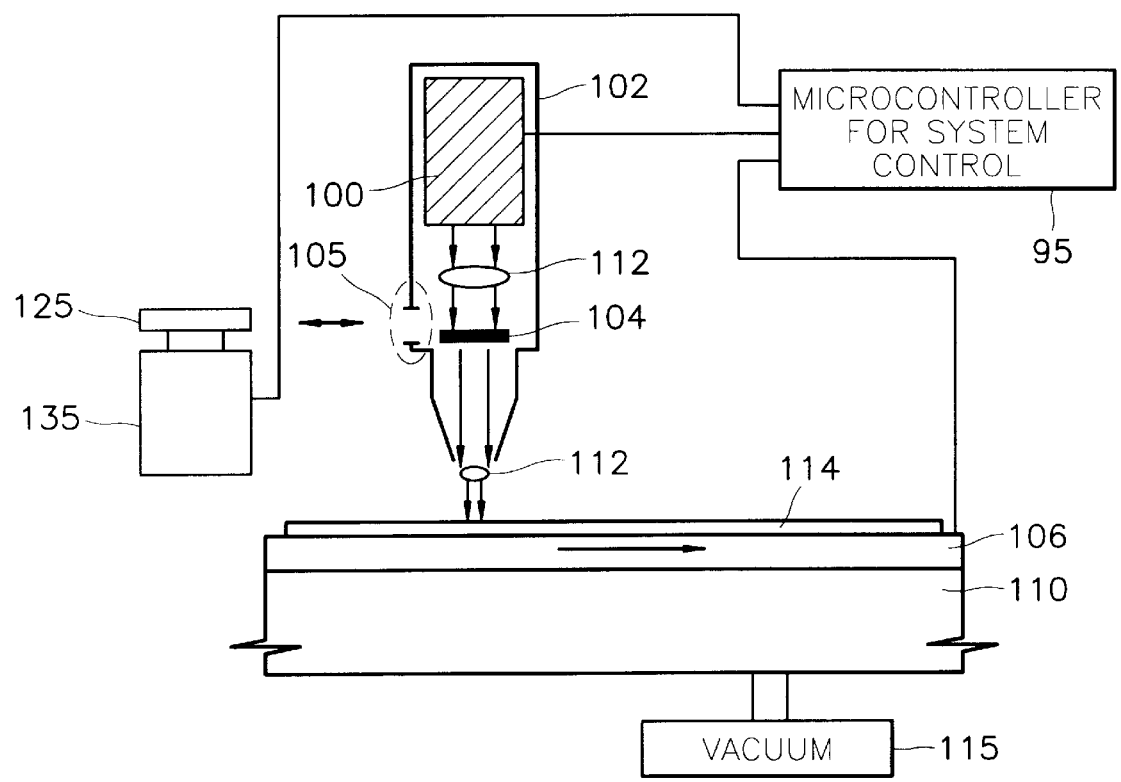
FIG. 3 shows a leadframe manufacturing apparatus when the laser mask of FIG. 1 is placed in the laser beam irradiating path tube.

FIG. 3 shows a leadframe manufacturing apparatus when the laser mask 104 of FIG. 1 is placed in the laser beam path tube 102.

In detail, the laser beam irradiated by the laser beam generator 100 is adjusted in the laser beam path tube 102 by the collimators expanders 112 and passes through the laser mask 104 which is partially coated with a laser beam absorbent, and then is irradiated onto the leadframe material 114 placed on the leadframe transferring unit 106, thereby cutting a portion of the leadframe material 114. The cut portion of the leadframe material is collected by suction of the vacuum pump 115, which is connected to the laser beam absorbing unit 110, placed at the lower part of the apparatus. The laser mask 104 can be automatically exchanged via a laser mask exit 105 formed in the laser beam path tube 102, by a manipulator 125 placed outside of the laser beam path tube 102. A manipulator controller 135 placed below the manipulator 125 controls the manipulator 125 in X, Y and Z directions. The leadframe manufacturing apparatus of FIG. 3 is the same as the apparatus of FIG. 1 except that the laser mask 104 is placed between the collimators 112 in the laser beam path tube 102, instead of below the laser beam path tube 102. Here, the controller 95 controls the manipulator controller 135 such that the laser mask 104 is automatically replaced through the laser mask exit 105. Also, the controller 95 controls irradiation sequence and intensity of the laser beams generated by the laser beam generator 100, and the position of the leadframe material 114 transferred by is the leadframe transferring unit 106.

Figure 4:
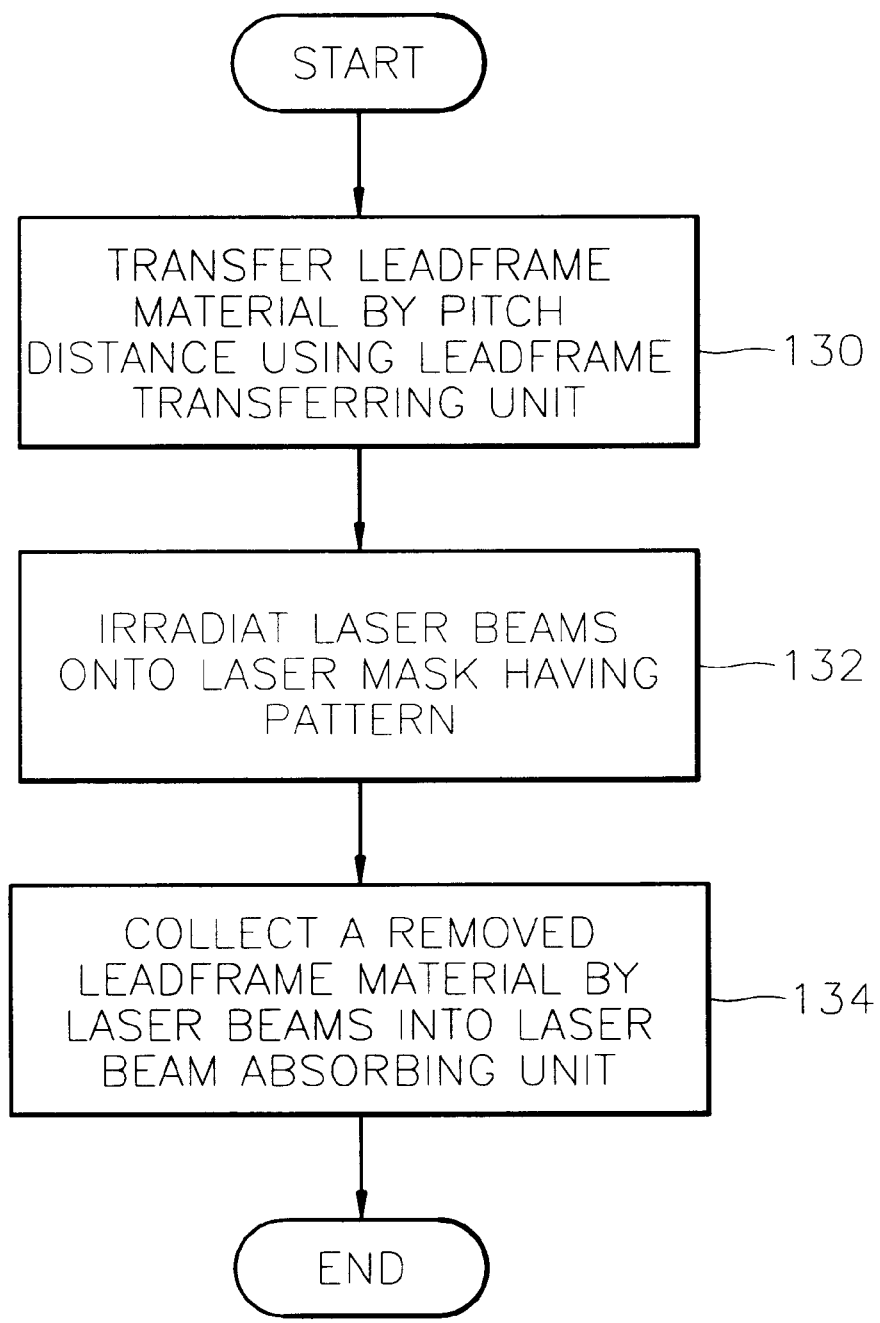
FIG. 4 is a flowchart illustrating a method for manufacturing a leadframe by using the leadframe manufacturing apparatus of FIG. 1.

FIG. 4 is a flowchart illustrating a method for manufacturing a leadframe by using the leadframe manufacturing apparatus shown in FIG. 1.

Referring to FIGS. 1 and 4, the leadframe transferring unit 106 of the leadframe manufacturing apparatus is controlled such that the leadframe material 114 is transferred by a distance equal to the interval between leadframe material (step 130).

When the leadframe material has been transferred, the laser beams generated by the laser beam generator 100 are irradiated onto the laser mask 104 having a predetermined pattern via the laser beam path tube 102 (step 132). As a result, the leadframe material placed below the laser mask 104 is cut along the pattern formed in the laser mask 104. The cut portion of the leadframe material 114 is sucked by the vacuum pump 115 installed in the laser beam absorbing unit 110 and then collected into the laser beam absorbing unit 110 (step 134).

Figure 5:
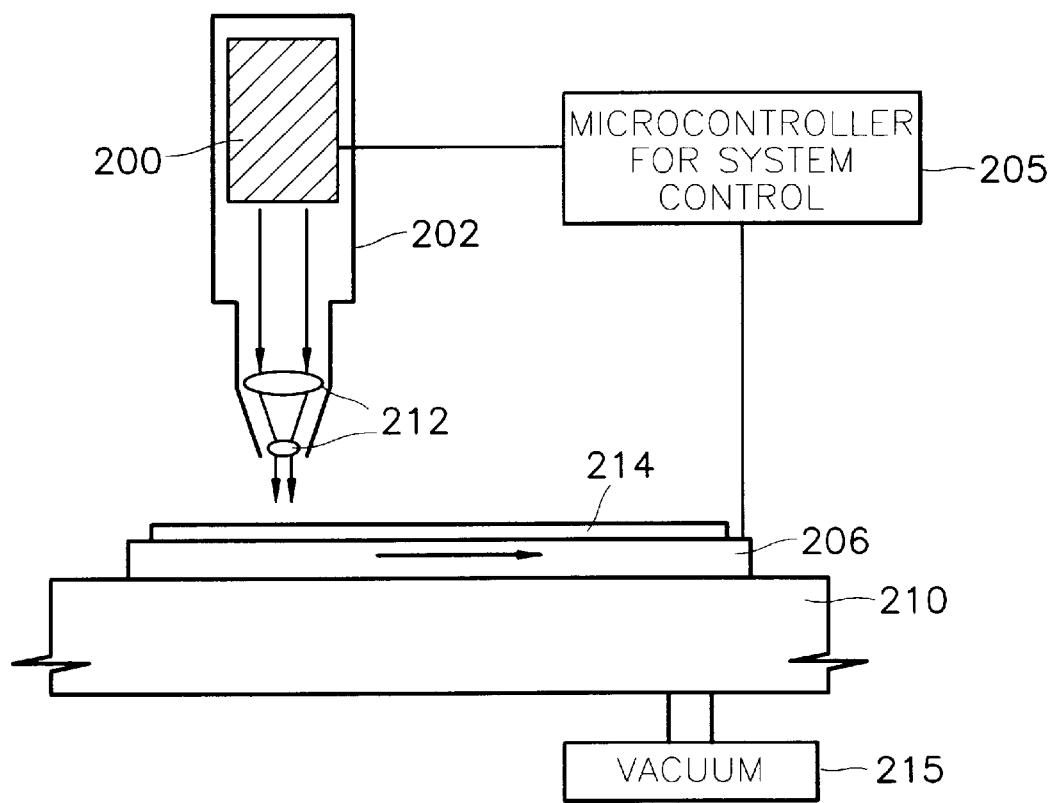
FIG. 5 shows a leadframe manufacturing apparatus using laser beams according to another embodiment of the present invention.
Figure 6:
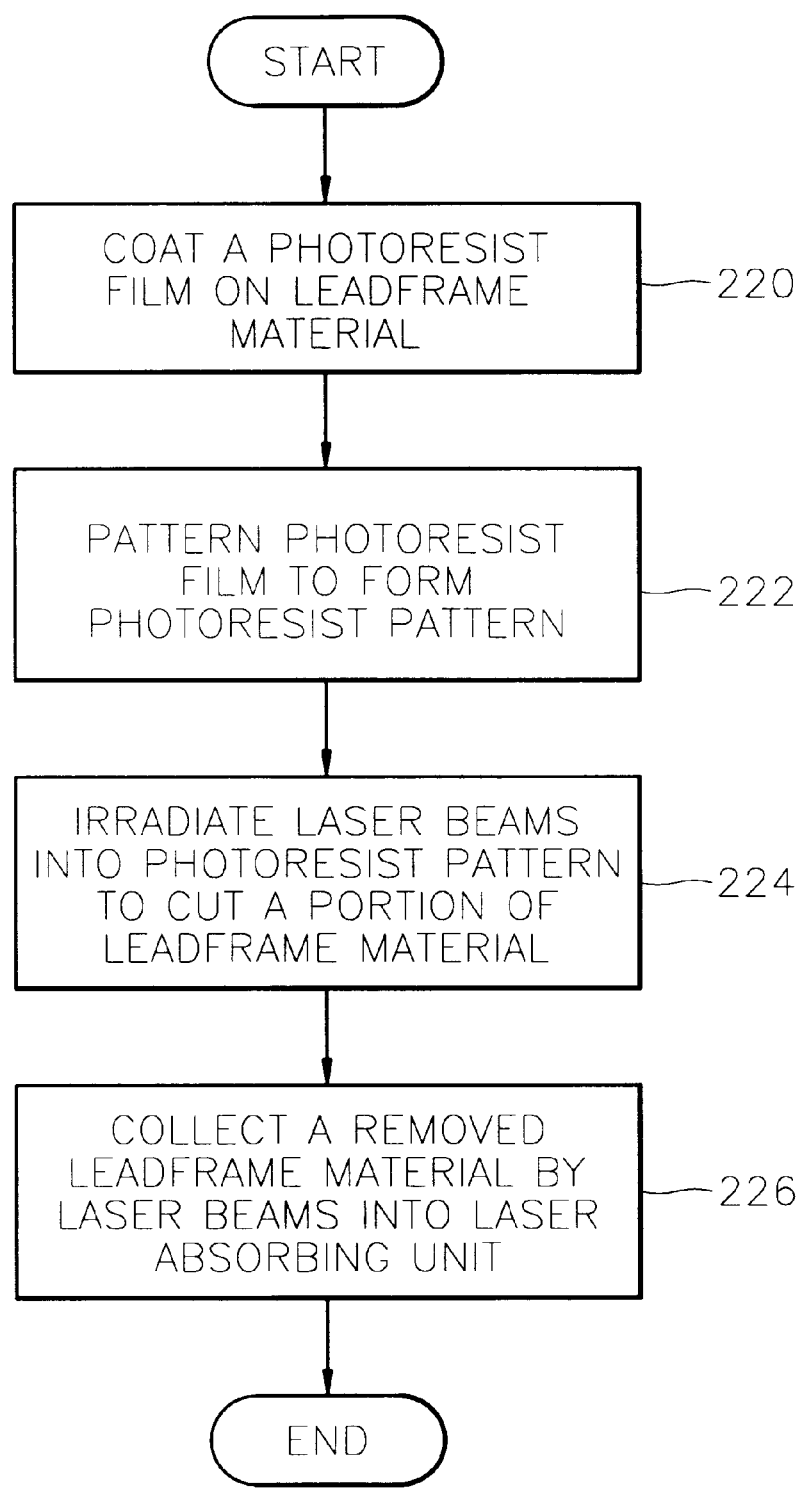
FIG. 6 is a flowchart illustrating a method for manufacturing a leadframe by using the leadframe manufacturing apparatus of FIG. 5.

Referring to FIGS. 5 and 6, a leadframe manufacturing apparatus according to a second embodiment of the present invention and a method for manufacturing a leadframe using the apparatus will be described.

FIG. 5 shows a leadframe manufacturing apparatus using laser beams according to a second embodiment of the present invention.

The leadframe manufacturing apparatus of FIG. 5 is characterized in that a photoresist pattern is coated onto the leadframe material and then patterned such that the leadframe material is selectively cut by irradiating laser beams.

Thus, the leadframe manufacturing apparatus according to the second embodiment is the same as the apparatus of FIG. 1 except that the second embodiment does not use a laser mask. In FIG. 5, reference numeral 200 represents a laser beam generator, reference numeral 202 represents a laser beam path tube, reference numeral 206 represents a leadframe transferring unit for transferring leadframe by a distance equal to a pitch, reference numeral 210 represents a laser beam absorbing unit having a vacuum pump 215, reference numeral 212 represents collimators for making the radiation of laser beams uniform and parallel, and reference numeral 214 represents a leadframe material.

FIG. 6 is a flowchart illustrating a method for manufacturing a leadframe using the leadframe manufacturing apparatus shown in FIG. 5.

Referring to FIGS. 5 and 6, according to the leadframe manufacturing method of the second embodiment, first a photoresist film is coated onto the leadframe material, to block the laser beams (step 220). Then, exposing and developing processes are performed to pattern the photoresist film coated on the leadframe material (step 222). The resultant leadframe material having the photoresist pattern is placed on the leadframe transferring unit 206 of FIG. 5, and then the laser beams generated by the laser beam generator 200 are irradiated onto the leadframe material via the laser beam path tube 202 (step 224). As a result, a portion of the leadframe material is cut along the photoresist pattern, and then the cut portion of the leadframe material is collected by the vacuum pump 215 installed in the laser beam absorbing unit 210 (step 226). Here, the leadframe transferring unit 206 transfers the leadframe material by a distance equal to a pitch. The leadframe manufacturing method of this embodiment is different from the method of the first embodiment in which the leadframe material is cut using a laser mask.

As described above, the present invention manufactures the leadframe using laser beams and provides the following benefits. First, developing time is reduced, which lowers the cost. Second, the present invention can form a fine pattern more precisely than the conventional stamping or etching methods. Third, the present invention can dramatically reduce mechanical defects caused by a stamping apparatus such as a punch and die. Fourth, the present invention can suppress such defects as chemical contaminations, which can be caused by etching methods.

The present invention is not limited to the above embodiments, and alterations and modifications within the spirit and scope of the present invention will occur to those skilled in the art.

What is claimed is:

1. An apparatus for manufacturing a leadframe, said leadframe with components of a chip pad, an inner lead and an external lead, comprising:

a laser beam generator generating a laser beam and projecting the laser beam on a laser beam path from the laser beam generator to a leadframe, the laser beam irradiating over an area of the chip pad, the inner lead and the external lead to form a component of the leadframe;

a laser beam path tube that substantially covers the laser beam path;

a leadframe transferring unit that transfers leadframe material to be irradiated by said laser beam generator;

a controller connected to said laser beam generator and said leadframe transferring unit, which controls the transfer and irradiation of said leadframe material;

a laser mask located between said laser beam generator and said leadframe transferring unit, said laser mask containing a pattern corresponding to the leadframe; and a laser beam absorbing unit, for supporting said leadframe transferring unit.

2. A leadframe manufacturing apparatus as recited in claim 1, wherein said pattern formed in said laser mask corresponds to an inner frame tip of the leadframe.

3. A leadframe manufacturing apparatus as recited in claim 1, further comprising a laser mask exit unit formed in said laser beam path tube through which said laser mask is replaced.

4. A leadframe manufacturing apparatus as recited in claim 3, wherein said controller controls the replacement of said laser mask through said laser mask exit.

5. A leadframe manufacturing apparatus as recited in claim 1, wherein said controller controls irradiation sequence and intensity of the laser beams generated by the laser beam generator.

6. A leadframe manufacturing apparatus as recited in claim 1, wherein said controller controls the position of a leadframe material on said leadframe transferring unit.

7. A leadframe manufacturing apparatus for manufacturing a leadframe by coating a photoresist film for a pattern of the leadframe said apparatus comprising:

a laser beam generator generating a laser beam, the laser beam irradiating over entire surface of a unit of the leadframe and selectively cutting out the leadframe according to the pattern formed by the coated photoresist film;

a laser beam path tube that substantially covers the laser beam path;

a leadframe transferring unit that transfers leadframe material that is to be irradiated by said laser beam generator;

a controller connected to said laser beam generator and said leadframe transferring unit, which controls the transfer and irradiation of said leadframe material; and a laser beam absorbing unit for supporting said leadframe transferring unit.

8. A leadframe manufacturing apparatus as recited in claim 7, wherein said controller controls irradiation sequence and intensity of the laser beams generated by said laser beam generator.

9. A leadframe manufacturing apparatus as recited in claim 7, wherein said controller controls the position of a leadframe material on said leadframe transferring unit.

* * * * *